United States Patent [19]

Brown et al.

[11] Patent Number: 5,521,234

[45] Date of Patent: May 28, 1996

[54] FLUIDIZED POLYMER SUSPENSION (FPS) FOR CONTINUOUS COATING COMPOSITION MANUFACTURE

[75] Inventors: Richard G. Brown, Wilmington, Del.; Charles L. Burdick, Landenberg, Pa.; Charles W. Vanderslice, Newark, Del.

[73] Assignee: Aqualon Company, Wilmington, Del.

[21] Appl. No.: 235,056

[22] Filed: Apr. 29, 1994

Related U.S. Application Data

[63] Continuation of Ser. No. 857,987, Mar. 26, 1992.

[51] Int. Cl.[6] .............................. C08L 1/26; C08K 3/32; C08K 3/30; C08K 3/26

[52] U.S. Cl. .................. 524/44; 524/42; 524/43; 524/46; 524/416; 524/423; 524/425; 106/171; 106/177; 106/194; 106/197.1; 106/197.2

[58] Field of Search ................... 524/42, 44, 46, 524/43, 416, 423, 425; 106/171, 194, 177, 197.1, 197.2

[56] References Cited

U.S. PATENT DOCUMENTS

| | | | |
|---|---|---|---|
| 4,283,229 | 8/1981 | Girg et al. | 106/171 |
| 4,883,536 | 11/1989 | Burdick | 106/194 |
| 4,883,537 | 11/1989 | Burdick | 106/194 |
| 5,028,263 | 7/1991 | Burdick | 524/401 |

*Primary Examiner*—Paul R. Michl
*Assistant Examiner*—LaVonda R. DeWitt
*Attorney, Agent, or Firm*—David Edwards

[57] ABSTRACT

A Fluidized Polymer Suspension (FPS) thickener comprising a hydroxyethylcellulose and/or alkyl or arylalkyl hydrophobically modified hydroxyethylcellulose added continuously to an aqueous dispersion increases productivity for manufacture of aqueous coating compositions. The FPS can be stored and metered without delays associated with dry powders. A latex paint is continuously produced by simultaneously or sequentially mixing latex binder, dispersed pigment and FPS thickener along with other ingredients.

12 Claims, No Drawings

FLUIDIZED POLYMER SUSPENSION (FPS) FOR CONTINUOUS COATING COMPOSITION MANUFACTURE

This application is a continuation of application Ser. No. 07/857,987, filed Mar. 26, 1992.

FIELD OF THE INVENTION

The invention relates to aqueous coating compositions which contain a water soluble polymer as a thickener. In particular the invention relates to manufacture of a coating composition where the thickener is incorporated as a Fluidized Polymer Suspension (FPS).

BACKGROUND OF THE INVENTION

U.S. Pat. No. 4,283,229 (Girg et al.) discloses that stable suspensions of nonionic cellulose ethers can be prepared in a solution of 4 to 12% electrolyte if alumina is added to the suspension. Prior art aqueous fluid suspensions of water soluble polymers are further described in U.S. Pat. Nos. 4,883,536 and 4,883,537. U.S. Pat. No. 4,883,536 covers the use of ammonium salts such as diammonium sulfate (DAS), diammonium phosphate (DAP), and ammonium polyphosphate for preparing fluid suspensions of water soluble polymers. U.S. Pat. No. 4,883,537 covers the use of concentrated aqueous potassium carbonate for preparing suspensions of sodium carboxymethylcellulose.

SUMMARY OF THE INVENTION

It is an object of the invention to provide a process for continuous manufacture of aqueous coating compositions for paint wherein a Fluidized Polymer Suspension (FPS) containing a thickener or thickener combination is used for rapid viscosity adjustment and ease of handling.

This process for producing an aqueous coating composition containing latex binder, pigment, and nonionic cellulose ether comprises simultaneously mixing a latex binder, dispersed pigment, and a fluidized polymer suspension of a hydroxyalkylcellulose or an alkyl or arylalkyl hydrophobically modified cellulose ether in an amount sufficient to prepare a coating composition.

Preferred thickeners are hydroxyethylcellulose (HEC) and hydrophobically modified hydroxyethylcellulose (HMHEC) containing an alkyl or arylalkyl group where the hydroxyethylcellulose has a Degree of Polymerization (D.P.) of from 800 to 4000, a hydroxyethyl Molar Substitution (M.S.) of 1.5 to 4.5 and a hydrophobe Degree of Substitution (D.S.) of from 0.001 to 0.01.

DETAILED DESCRIPTION OF THE INVENTION

It has been discovered that productivity in the manufacture of aqueous coating compositions comprising a latex binder, pigment, and a thickener can be significantly increased relative to the use of powdered materials, when an FPS containing a hydroxyalkylcellulose or a hydrophobically modified cellulose ether is added either batchwise or continuously. Hydroxyethylcellulose represents a hydroxyalkylcellulose which is widely used in the paint industry as a thickener. Hydrophobically modified cellulose ethers have come to be known as associative thickeners owing to their properties of enhanced viscosification provided by the associative behavior of hydrophobes chemically bound to a cellulose polymer. Assignee's copending patent applications, Ser. Nos. 428,912 and 701,756 disclose an arylalkyl hydrophobically modified hydroxyethylcellulose which provides improved leveling and sag resistance in a latex paint.

Due to the time required for hydration and dissolution of a powdered cellulosic polymer in waterborne paint, continuous production of paint, utilizing dry water-soluble cellulosics, is not advantageous as compared to the novel use of FPS for the same result. The more rapid dissolution rates of FPS versus the dry material are also a benefit in batch paint production where residence time in the mixing chamber can be reduced significantly.

The following detailed experimental procedures were used in the examples which demonstrate the practice of the invention.

A 5-inch ID stainless steel vessel, with a ½-inch diameter exit port and metal cuff on the bottom, was clamped to a support and the shaft and 2-inch diameter blade of a high speed impeller were inserted into the vessel to within ¼-inch of the bottom of the vessel. The blade was slightly off center in the vessel while the exit port was centered in the bottom of the vessel. The exit port of the vessel was fitted with a tube with an in-line flow rate control. Two large glass reservoirs were clamped to a support above the vessel; the reservoirs were fitted with tubes which reached into the vessel and which had flow rate control in-line. A peristaltic pump was fitted with tubing which reached into the stainless steel vessel and into a reservoir containing Natrosol® FPS-Plus 330 fluidized polymer suspension (available from Aqualon). One reservoir above the steel vessel was filled with Component 1 and the other with Component 2 (see Table 1). Flow rates were adjusted so that Component 1 entered the vessel at 9.75 grams per minute; Component 2 was introduced at 10 grams per minute; and Component 3 was added at 0.375 grams per minute. Impeller speed was approximately 2500 rpm (peripheral speed of 1310 feet per minute). After the flow rates were adjusted and the liquid level had risen to several inches above the blade, material was allowed to exit through the port in the bottom of the vessel at a rate equal to the combined addition rates of all three components. The material which exited was the finished product and was compared to the batch production control.

Continuous production can involve either simultaneous or sequential addition of ingredients.

The batch production control paint was prepared by simply adding each paint ingredient, one at a time, to a vessel equipped with a high-speed impeller. The order of addition was typical of batch paint production in which the water-soluble polymer, present as the rheology control agent, was dispersed in glycols and the pigment was dispersed in this fluid medium before the bulk of the ingredients were added to "let down" the paint. In this case, the water-soluble polymer was added in the form of an FPS, and pigment was added as a $TiO_2$ slurry.

Initial viscosity, as well as the viscosity of paints which had aged overnight, were determined on a Stormer Viscometer at 200 rpm. viscosity data are reported in Kreb Units in Table 2. Weight percent cellulosic thickener is also reported and is based on the total weight of FPS×0.25 (FPS is 20–25% wt. % polymer, depending on type) divided by total weight of paint×100. High shear viscosity was determined on an ICI cone and plate viscometer at $12,000s^{-1}$. Leveling was determined using a Leneta Leveling Test Blade and Drawdown Levelness Standards. Sag resistance was measured using a Leneta Anti-Sag Meter. Spatter resistance testing was conducted by rolling out paint on a vertical surface above a black panel.

Spatter patterns were compared to Gardner/Sward standards appearing in the 13th Edition of the ASTM Paint Testing Manual (STP 500). Specular gloss at 60° was measured using a BYK Labotron Gloss Unit.

Delta E (color development) values were based on measurement of color parameters using a Brightimeter over drawn down and "rubbed-up" areas on the unsealed portion of a test chart. Scrub resistance testing was conducted using ASTM Method D2486.

The invention has industrial applicability for the manufacture of paints. The examples illustrate both batch and continuous paint making processes without being limiting.

Procedure A

Preparation of Natrosol® FPS-Plus 330

A fluidized polymer suspension of Natrosol® Plus 330 HMHEC was prepared in concentrated aqueous diammonium sulfate (DAS) solution for evaluation as a paint thickening agent. To prepare the suspension as a first step, 0.2 parts by weight of Kelzan® S xanthan gum was dissolved in 60.5 parts by weight water with two hours stirring. After the xanthan had dissolved, 14.2 parts by weight of DAS was added to the solution and stirred to dissolve. After the DAS had dissolved, 25 parts by weight of Natrosol® Plus 330 HMHEC was added to the solution and stirred briefly to disperse. As a final step, 0.1 parts by weight of Proxel® GXL preservative was added to the suspension with stirring. The final product was a pourable fluid suspension designated Natrosol® FPS-Plus 330.

Procedure B

Preparation of Natrosole® FPS-G

A fluidized polymer suspension of Natrosol® 250GR HEC was prepared for evaluation as a paint thickening agent. To prepare the suspension in the first step 1 part by weight of CMC-7L1T was dissolved in 59.7 parts of water with 30 minutes stirring. After this 14.2 parts by weight of diammonium phosphate (DAP) was added to the water and stirred to dissolve. After the CMC and DAP were completely dissolved, 25 parts by weight of Natrosol® 250GR HEC was added to the solution and stirred to disperse. As a final step, 0.1 parts by weight of Proxel GXL® preservative was added to the suspension with stirring. The end product was observed to be a pourable fluid suspension designated Natrosol® FPS-G.

Procedure C

Preparation of Natrosol® FPS-HB

A fluid suspension of Natrosol® 250 HBR HEC was also prepared in a different manner for evaluation as a paint thickener. In the first step of preparation, 0.2 parts by weight of Kelzan® S xanthan gum was dissolved in 47.8 parts by weight of water with 2 hours stirring. After the xanthan was dissolved, 0.9 parts by weight of Lomar® D condensed naphthalene sulfonate was added to the water and stirred to dissolve. Following this, 0.1 parts by weight of Hercules® Defoamer SGL was added to the water and then 30 parts by weight of sodium formate was added to the water and stirred to dissolve. Once the sodium formate had dissolved, 20 parts by weight of Natrosol® 250HBR HEC was added to the water and stirred briefly to disperse. After this, 0.9 parts by weight of Alipal® CO-433 was added to the mixture and stirred briefly to disperse. As a final step, 0.1 parts by weight of Proxel® GXL was added as a preservative to the suspension and stirred briefly. The resulting product was observed to be a pourable fluid suspension designated Natrosol® FPS-HB.

Procedure D

Preparation of Natrosol® FPS-MB

A fluidized polymer suspension of Natrosol® 250MBR HEC was prepared with identical methodology and ingredients as described in the previous example above only in this case Natrosol® 250MBR HEC was substituted for Natrosol® 250HBR HEC. A pourable fluid suspension was obtained in this case designated Natrosol® FPS-MB. This product was evaluated in paint.

Procedure E

Preparation of Natrosol® FPS-Plus 430

A fluidized polymer suspension of Natrosol® Plus 430 HMHEC was prepared in concentrated aqueous sodium formate for use in paint making. To prepare the suspension, 0.16 parts by weight of Kelzan® S xanthan gum was first dissolved with two hours stirring in 56.74 parts by weight of water. After the xanthan had dissolved, 28 parts by weight of sodium formate was dissolved in the water with brief stirring. Once the sodium formate had dissolved, 25 parts by weight of Natrosol® Plus 430 HMHEC were added to the solution and stirred to disperse. As a final step, 0.1 parts by weight Proxel® GXL preservative was added to the suspension. The final product, designated Natrosol® FPS-Plus 430, was observed to be fluid and pourable. This product was evaluated in paint.

EXAMPLE 1

Interior Semigloss Continuous Production

A Fluidized Polymer Suspension (FPS) polymer system for thickening and rheology control was used to thicken a semigloss paint in a continuous process utilizing all liquid components. The paint formulation was a slightly modified version of a published formulation and was based on a vinyl-acrylic latex. Paint ingredients were divided into two blended components and a third component which consisted of a Fluidized Polymer Suspension (FPS). All liquid materials were used including a titanium dioxide slurry. The compositions of the three components are listed in Table 1.

TABLE 1

| CONTINUOUS PAINT MAKING COMPONENTS | |
|---|---|
| Material | Grams |
| Component 1 | |
| Ucar ® 367 | 934.00 |
| Texanol ® | 40.00 |
| Nopco ® NDW | 6.00 |
| Propylene Glycol | 54.10 |
| Total | 1034.10 |
| Component 2 | |
| Propylene Glycol | 135.90 |
| Tamol ® 731 | 23.00 |
| Triton ® N-57 | 2.66 |
| Nuosept ® 95 | 2.00 |

TABLE 1-continued

CONTINUOUS PAINT MAKING COMPONENTS

| Material | Grams |
| --- | --- |
| Nopco ® NDW | 4.00 |
| Triton ® GR-7M | 2.00 |
| Ti-Pure ® R-940 Slurry | 666.66 |
| Water | 232.00 |
| AMP-95 ™ | 2.66 |
| Total | 1070.88 |
| Component 3 | |
| Natrosol ® FPS-Plus 330 (see Procedure A) | 39.44 |

Formulation Constants

PVC = 22.4%
NVW = 48.9%
Initial Viscosity = 88 KU

The two blended components and the FPS were metered simultaneously into a stainless steel vessel which was equipped with a high speed impeller and outlet port. Blended components were added, by gravity feed, at 9.75 grams per minute (Component 1) and 10 grams per minute (Component 2). FPS (Component 3) was added 0.375 grams per unit using a peristaltic pump. Addition rates were adjusted so as to keep the paint composition constant over the course of paint production and the ingredients in proper proportion relative to one another. Paint was removed from the vessel at a rate equal to the combined component addition rates. As a control, the same paint formula was prepared in a typical batch process.

The properties of the paints produced by both continuous and batch processes are listed in Table 2.

TABLE 2

PAINT PROPERTIES FOR CONTINUOUS AND BATCH PROCESSES

| | Process: | |
| --- | --- | --- |
| Property | Continuous | Batch |
| KU I/ON* | 88/95 | 85/91 |
| Weight % Thickener | 0.46 | 0.46 |
| HSV (ICI, Ps) | 1.1 | 1.1 |
| Leveling | 3 | 2 |
| Sag | 22 | 24 |
| Spatter | 9 | 8 |
| Gloss (60°) | 56 | 59 |
| Delta E | 0.6 | 0.5 |
| Scrub, cycles | >1600 | >1600 |

*I/ON = Initial/Overnight

This example shows that continuous paint manufacture with FPS yields the same quality paint as with a batch paint process. Continuous paint manufacture is only possible with FPS and not dry cellulosic polymer.

EXAMPLE 2

Interior Flat Batch Production

The interior flat paint, shown in Table 3 was prepared using a high-speed disperser and vessel. Water, KTPP dispersant, R & R 551® water-dispersible lecithin dispersant, Tamol® 731 dispersant (Rohm and Haas), Hercules® SGL defoamer, ethylene glycol wet-edge agent, and Carbitol® acetate coalescing solvent were sequentially added to the mixing vessel with the disperser operating at low speed (~1400 ft/minute). The Ti-Pure® R-901 titanium dioxide pigment, Camel CARB® calcium carbonate pigment, Iceberg® clay pigment, and Imsil® 1160 silica pigment were then charged in order to the vessel and the speed increased to ~4000 ft/minute. The let-down was conducted by adding the Makon® 10 surfactant, Polyco® 2161 vinyl acrylic latex and Proxel® GXL can preservative with thorough mixing until a smooth uniform base paint resulted. It has been found that the FPS can be added as well to the pigment dispersion before let-down or at virtually any stage of manufacture.

A 200 g portion of the base paint (Table 3) was thickened by adding 5.41 g of Natrosol® FPS-Plus 330 (25 wt. % Natrosol® Plus 330 HMHEC) and 49.59 g of water with moderate stirring on a propeller stirrer. A second sample of base paint was thickened by adding 38.25 g of a 4 wt. % aqueous solution of the same lot of Natrosol® Plus 330 HMHEC and 16.75 g of water with stirring. The resulting paints were evaluated using standard paint testing techniques. The initial Stormer viscosities of these two paints were found to be 94 and 95 KU, respectively. The weight percent dry thickener levels (thickening efficiencies) on total paint were, respectively, 0.53% and 0.60%. Comparative application properties were as follows:

TABLE 3

FLAT BASE PAINT FORMULATION

| Material | Parts by Weight |
| --- | --- |
| Water | 1350.0 |
| KTPP | 13.5 |
| Ross & Rowe 551 ® | 13.5 |
| Tamol ® 731 | 33.8 |
| Hercules ® SGL Defoamer | 13.5 |
| Ethylene Glycol | 135.5 |
| Carbitol ® Acetate | 67.5 |
| Ti-Pure ® R-901 | 1181.3 |
| Camel CARB ® | 1012.5 |
| Iceberg ® Clay | 843.8 |
| Imsil ® 1160 | 168.8 |
| Let Down | |
| Makon ® 10 | 20.3 |
| Polyco ® 2161 | 1350.0 |
| Proxel ® GXL | 3.4 |
| Total | 6207.4 |

| Thickener Form | Leneta Leveling | Anti-Sag Index | Brushing Viscosity | Spatter Resistance | Contrast Ratio | Color Dev. |
| --- | --- | --- | --- | --- | --- | --- |
| FPS | 3 | 15 | 1.1 | 9 | 0.985 | 0.88 |
| Solution | 3 | 16 | 1.2 | 9 | 0.982 | 1.25 |

Level scale: 10=perfect leveling; 0=extremely poor leveling.
Anti-sag Index: 24=no sag; 4=extreme sag.
Brushing Viscosity: measured in poises on an ICI viscometer.
Spatter Resistance: 10=no spatter; 0=extreme spatter.
Contrast Ratio: measured at 3-mils wet after drying.
Color Development: measured as color difference.

EXAMPLE 3

Interior Flat Batch Production

A 200 g aliquot of the interior flat base paint, shown in Table 3, was thickened with 5.48 g of Natrosol® FPS-HB (20 wt. % Natrosol® 250 HBR HEC) and 49.5 g of water to an initial Stormer viscosity of 96 KU. A second equivalent portion was thickened with 38.25 g of a 3 wt. % aqueous solution of the same Natrosol® 250 HBR HEC lot and 16.75 g of water. The resulting Stormer viscosity was 95 KU. Relative percent thickening efficiencies were 0.43 and 0.45%, respectively. The applied properties of each paint were as follows:

| Thickener Form | Leneta Leveling | Anti-Sag Index | Brushing Viscosity | Spatter Resistance | Contrast Ratio | Color Dev. |
|---|---|---|---|---|---|---|
| FPS | 3 | 10 | 0.9 | 2 | 0.986 | 0.95 |
| Solution | 3 | 12 | 0.8 | 2 | 0.986 | 1.14 |

EXAMPLE 4

Interior Semigloss Batch Production

By the same paint-making technique illustrated in Example 2 above, the interior semigloss base paint shown in Table 4 was prepared. A 235 g portion of this semigloss base paint was then thickened with 3.85 g of Natrosol® FPS-MB (20 wt. % Natrosol® 250 MBR HEC) and 36.15 g of water to a Stormer viscosity of 88 KU. A second portion was thickened with 24.75 g of a 4 wt. % aqueous solution of the same Natrosol® 250 MBR HEC lot and 15.25 g of water. The initial Stormer viscosity was 89 KU. Relative weight percent thickening efficiencies were 0.28 and 0.36%, respectively. Comparative application properties are shown below:

| Thickener Form | Leneta Leveling | Anti-Sag Index | Brushing Viscosity | Spatter Resistance | 60° Gloss | Color Dev. |
|---|---|---|---|---|---|---|
| FPS | 4 | 24 | 2.1 | 1 | 39 | 2.37 |
| Solution | 3 | 24 | 1.9 | 1 | 39 | 2.44 |

EXAMPLE 5

Exterior Flat Batch Production

The exterior flat house paint formulation shown in Table 5 was prepared by the same paint-making technique described above in Example 2.

TABLE 4

SEMIGLOSS BASE PAINT FORMULATION

| Material | Parts by Weight |
|---|---|
| Propylene Glycol | 542.5 |
| Tamol® SG-1 | 57.7 |
| Hercules® SGL Defoamer | 13.6 |
| Ti-Pure® R-900 | 1627.5 |
| Imsil® A-15 | 169.6 |
| Let Down | |
| Rhoplex® AC-417 | 3390.6 |
| Hercules® SGL Defoamer | 18.4 |
| Propylene Glycol | 67.9 |
| Texanol® | 146.5 |
| Proxel® GXL | 6.8 |
| Triton® GR-7M | 3.5 |
| Water | 140.5 |
| Total | 6184.8 |

TABLE 5

EXTERIOR FLAT BASE PAINT

| Material | Parts by Weight |
|---|---|
| Water | 720.0 |
| Foamaster® VL | 6.0 |
| Ethylene Glycol | 167.4 |
| Tamol® 850 | 63.0 |
| KTPP | 9.0 |
| Triton® CF-10 | 15.0 |
| Ti-Pure® R-902 | 1620.0 |
| Horsehead® XX-503R | 300.0 |
| Minex™ 4 | 900.0 |
| Disperse to Hegman 6 on a high-speed disperser and let-down as follows: | |
| Let Down | |
| Rhoplex® AC-64 | 2291.4 |
| Foamaster® VL | 18.0 |
| Texanol® | 69.6 |
| Skane® M-8 | 9.0 |
| Total | 6188.4 |

A 245 g portion of exterior flat base paint was thickened with 5.46 g of Natrosol® FPS-G (25 wt. % Natrosol® 250 GR HEC) and 33.94 g of water to an initial Stormer viscosity of 93 KU. A second aliquot was thickened using 12.32 g of a 12 wt. % aqueous solution of the same Natrosol® 250GR HEC lot and 27.08 g of water. The initial Stormer viscosity was 92KU. Weight percent thickening efficiencies were, respectively, 0.48 and 0.52%. Comparative application properties were as follows:

| Thickener Form | Leneta Leveling | Anti-Sag Index | Brushing Viscosity | Spatter Resistance | Color Dev. |
|---|---|---|---|---|---|
| FPS | 1 | 24 | 1.0 | 3 | 0.42 |
| Solution | 1 | 24 | 0.9 | 3 | 0.83 |

EXAMPLE 6

Interior Flat Batch Production

The interior flat base paint shown in Table 6 was prepared according to the procedure described in Example 2.

TABLE 6

INTERIOR FLAT BASE PAINT

| Material | Parts by Weight |
|---|---|
| Water | 1760.0 |
| Ethylene Glycol | 64.0 |
| Texanol® | 64.0 |
| Colloid® 643 | 12.8 |
| Proxel® GXL | 6.4 |
| AMP-95™ | 6.4 |
| Tamol® 731 | 32.0 |
| Makon® 10 | 19.2 |
| Ti-Pure® R-931 | 800.0 |
| ASP® 170 | 640.0 |
| ASP® 400 | 640.0 |
| Camel-CARB® | 832.0 |
| Disperse to Hegman 3–4 on a high-speed disperser and let-down as follows: | |
| Let Down | |
| UCAR® 367 | 1152.0 |

TABLE 6-continued

INTERIOR FLAT BASE PAINT

| Material | Parts by Weight |
|---|---|
| Colloid ® 643 | 12.8 |
| Total | 6041.6 |

A 230 g sample was thickened with 4.03 g of Natrosol® FPS-Plus 430 (25 wt % Natrosol® Plus 430 HMHEC) and 45.97 g of water to an initial Stormer viscosity of 97 KU. A second portion was thickened using 33.60 g of a 3 wt. % solution of the same Natrosol® Plus 430 HMHEC lot and 16.40 g of water. The initial Stormer viscosity was 96 KU. The thickening efficiency was 0.36% in both cases. Paint application properties are compared below:

| Thickener Form | Leneta Leveling | Anti-Sag Index | Brushing Viscosity | Spatter Resistance | Color Dev. |
|---|---|---|---|---|---|
| FPS | 6 | 10 | 0.7 | 7 | 0.80 |
| Solution | 7 | 11 | 0.7 | 7 | 0.29 |

EXAMPLE 7

Interior Semigloss Batch Production

A 24.8% pigment volume concentration (PVC), 32.9% nonvolatiles by volume (NVV), semigloss formula, based on an all-acrylic latex, Rhoplex® AC-417 was used. The pH of the paint is 8.4. The formula is shown in Table 2. Base paint (300 grams), containing all paint ingredients except thickener and additional let-down water, was placed in a beaker on a torque transducer apparatus. The base paint was stirred with an H-blade stirrer at 1000 rpm. The torque, measured by the transducer and indicative of the viscosity of the paint, was followed as a function of time and was plotted on a strip chart recorder. In the case of dry polymer addition, 49.42 grams of water, followed by 1.58 grams of dry Natrosol® Plus 330 HMHEC was added to the stirring base paint. In the case of FPS, 44.68 grams of water and 6.32 grams of a fluidized polymer suspension containing 25 wt. % of the same Natrosol® Plus 330 HMHEC lot was added. The weight percent thickener in both paints was 0.45%. The semigloss paint thickened with the dry polymer did not achieve maximum viscosity (indicative of complete thickener dissolution) until 35 minutes had elapsed from the time of thickener introduction. The paint thickened with the fluidized polymer suspension achieved maximum viscosity in 20.5 minutes. In the case of the dry polymer, the maximum torque reading achieved was 32 units, while in the case of the FPS, the maximum torque reading was 40 units. This represents a 41.4% increase in speed of dissolution and 25% increase in thickening efficiency. These data are contained in Table 7.

Examples 2–6 demonstrated the utility of FPS for paint making to be equivalent to that of solutions of cellulosic polymers. Example 7 shows the benefit of FPS over dry cellulosic polymer for enhanced rate of paint production in a batch process.

TABLE 7

TORQUE (VISCOSITY) VS. TIME READINGS
DRY NATROSOL ® PLUS 330 VS. FLUIDIZED VERSION
OF NATROSOL ® PLUS 330 IN SEMIGLOSS PAINT

| Dry Natrosol ® Plus 330 HMHEC | | Fluidized Natrosol ® Plus 330 HMHEC | |
|---|---|---|---|
| Time (minutes) | Torque (viscosity) | Time (minutes) | Torque (viscosity) |
| 0.0 | 0.0 | 0.0 | 0.0 |
| 1.0 | 0.0 | 0.2 | 1.0 |
| 2.0 | 2.5 | 0.4 | 4.0 |
| 3.0 | 6.0 | 0.5 | 10.0 |
| 4.0 | 9.0 | 1.0 | 17.0 |
| 5.0 | 12.0 | 1.5 | 23.0 |
| 7.0 | 16.0 | 2.5 | 27.0 |
| 10.0 | 20.0 | 3.5 | 29.0 |
| 12.0 | 23.0 | 4.5 | 30.0 |
| 14.0 | 24.0 | 5.5 | 31.0 |
| 17.0 | 26.0 | 6.5 | 31.0 |
| 20.0 | 27.5 | 7.5 | 31.5 |
| 25.0 | 29.0 | 8.5 | 32.0 |
| 30.0 | 31.0 | 9.5 | 33.0 |
| 35.0 | 32.0 | 10.5 | 33.0 |
| 40.0 | 32.0 | 15.5 | 39.0 |
| 45.0 | 32.0 | 20.5 | 40.0 |
| | | 25.5 | 40.0 |

EXAMPLE 8

Flat Batch Production

A 62.7% PVC, 31.3% NVV formula based on a vinyl-acrylic latex (Polyco® 2161) was utilized. The pH of the paint is 7.2. The formula is shown in Table 3.

Base paint (250 grams), containing all paint ingredients except thickener and additional let-down water was placed in a beaker on a torque transducer apparatus. The base paint was stirred with an H-blade stirrer at 1000 rpm. The torque, measured by the transducer and indicative of the viscosity of the paint, was followed as a function of time and was plotted on a strip chart recorder. In the case of dry polymer addition, 65.72 grams of water, followed by 1.91 grams of dry Natrosol® Plus 330 HMHEC was added to the stirring base paint. In the case of FPS, 60.00 grams of water and 7.62 grams of a fluidized polymer suspension containing 25 wt. % of the same Natrosol® Plus 330 HMHEC was added. The weight percent thickener in both paints was 0.60%. The flat paint thickened with the dry polymer did not achieve maximum viscosity (indicative of complete thickener dissolution) until 65 minutes had elapsed from the time of thickener introduction. The paint thickened with the fluidized polymer suspension achieved maximum viscosity in 7.5 minutes. In the case of the dry polymer, the maximum torque reading achieved was 44 units, while in the case of the FPS, the maximum torque reading was 56 units. This represents a 88.5% increase in speed of dissolution and 27% increase in thickening efficiency. These data are contained in Table 8.

TABLE 8

TORQUE (VISCOSITY) VS. TIME READINGS DRY NATROSOL® PLUS 330 VS. FLUIDIZED VERSION OF NATROSOL® PLUS 330 IN FLAT PAINT

| Dry Natrosol® Plus 330 HMHEC | | Fluidized Natrosol® Plus 330 HMHEC | |
|---|---|---|---|
| Time (minutes) | Torque (viscosity) | Time (minutes) | Torque (viscosity) |
| 0.0 | 0.0 | 0.0 | 0.0 |
| 10.0 | 0.0 | 0.2 | 5.0 |
| 15.0 | 0.0 | 0.4 | 9.0 |
| 20.0 | 0.0 | 0.5 | 12.0 |
| 25.0 | 1.0 | 1.0 | 30.0 |
| 30.0 | 4.0 | 1.5 | 42.0 |
| 35.0 | 13.0 | 2.5 | 47.0 |
| 40.0 | 35.0 | 3.5 | 50.0 |
| 45.0 | 38.0 | 4.5 | 54.0 |
| 50.0 | 41.0 | 5.5 | 56.0 |
| 55.0 | 43.0 | 6.5 | 57.0 |
| 60.0 | 43.0 | 7.5 | 56.5 |
| 65.0 | 44.0 | 8.5 | 55.0 |
| 70.0 | 44.0 | 9.5 | 55.0 |
| 75.0 | 44.0 | 10.5 | 55.0 |
| 40.0 | 32.0 | 15.5 | 55.0 |
| 45.0 | 32.0 | 20.5 | 55.0 |
|  |  | 25.5 | 55.0 |

Higher throughput, either in batch or continuous production, results from faster dissolution rates of the FPS versus the dry polymer. The important parameter is how fast thickened paint achieves its maximum or "plateau" viscosity. Higher thickening efficiency is demonstrated in the same experiments. The same amount of thickener is added to the paint on an active basis and the paint thickened with FPS displays a higher viscosity than the paint thickened with the dry polymer. In batch production, the polymer is completely dissolved in a given volume of paint or paint components before the product is finished and packaged. In continuous paint production, the residence time of the paint ingredients in a mixing chamber is dependent on the speed with which the thickener dissolves. The viability of continuous paint production utilizing the FPS was demonstrated.

EXAMPLE 9–10

Improved Scrub Resistance

The paints in Example 2 were tested in accordance with ASTM Method D2486, "Scrub Resistance of Interior Latex Flat Wall Paints." As shown below, the sample thickened with Natrosol® FPS-HB had superior scrub resistance:

| Thickener Form | Scrub Resistance (cycles to failure) | Increase (%) |
|---|---|---|
| FPS | 661 | 40 |
| Solution | 472 | — |

Paints like those described in Example 5 were similarly tested in accordance with ASTM Method D2486. The data below demonstrate the superior scrub resistance obtained with the Natrosol® FPS-Plus 430-thickened paint versus the sample thickened with the solution polymer:

| Thickener Form | Scrub Resistance (cycles to failure) | Increase (%) |
|---|---|---|
| FPS | 560 | 43.5 |
| Solution | 390 | — |

The above two examples are not meant to limit the potential scrub improvements offered by other FPS products.

What is claimed is:

1. A process for continuously producing an aqueous coating composition containing latex binder and pigment comprising preparing an aqueous fluidized polymer suspension (FPS) of a conventional nonionic cellulose ether or an alkyl or arylalkyl hydrophobically modified cellulose ether where the hydrophobically modified cellulose ether is one or more of cetyl modified hydroxyethylcellulose nonylphenyl modified hydroxyethylcellulose, nonylphenyl modified ethyl hydroxyethylcellulose, or alkyl glycidyl ether modified hydroxyethylcellulose and further where the hydroxyethylcellulose or ethylhydroxyethylcellulose is hydrophobically modified with a degree of substitution (D.S.) of from 0.001 to 0.01 by dissolving in water at least one salt selected from the group consisting of potassium carbonate, potassium bicarbonate, diammonium sulfate, diammonium phosphate, sodium formate, and dibasic potassium phosphate to form a salt solution and then suspending the polymer in said salt solution to form a pourable fluid suspension and continuously dispersing the suspension in the latex binder and pigment in an amount sufficient to form the aqueous coating composition.

2. The process of claim 1 where the alkyl hydrophobically modified cellulose ether is cetyl modified hydroxyethylcellulose.

3. The process of claim 1 where additional ingredients selected from the group consisting of a preservative, a defoamer, a dispersant, a coalescing solvent, calcium carbonate, titanium dioxide, silica, a surfactant, and kaolin clay are added to prepare an aqueous latex paint.

4. The process of claim 3 where the fluidized polymer suspension contains a hydroxyalkylcellulose.

5. The process of claim 4 where the hydroxyalkylcellulose is hydroxyethylcellulose.

6. The process of claim 5 where the hydroxyethylcellulose has a Degree of Polymerization (D.P.) of from 800 to 4000.

7. The process of claim 1 where the FPS further contains a xanthan gum.

8. The process of claim 1 where the FPS contains a low molecular weight polysaccharide as a suspending agent.

9. The process of claim 8 where the low molecular weight polysaccharide is carboxymethylcellulose (CMC).

10. A process for producing an aqueous coating composition containing latex binder, pigment and nonionic cellulose ether comprising continuously and simultaneously or sequentially mixing a latex binder, dispersed pigment and a fluidized polymer suspension of an alkyl or arylalkyl hydrophobically modified cellulose ether where the arylalkyl hydrophobically modified cellulose ether is nonylphenyl modified hydroxyethylcellulose in an amount sufficient to prepare the aqueous coating composition, wherein the fluidized polymer suspension is prepared by dissolving in water at least one salt selected from the group consisting of potassium carbonate, potassium bicarbonate, diammonium sulfate, diammonium phosphate, sodium formate, and dibasic potassium phosphate to form a salt solution and then suspending the polymer in said salt solution to form a pourable fluid suspension and continuously dispersing the suspension in the latex binder and pigment in an amount sufficient to form the aqueous coating composition.

11. The process of claim 10 where the alkyl hydrophobically modified cellulose ether is cetyl modified hydroxyethylcellulose.

12. The process of claim 10 where the hydrophobically modified cellulose ether is an alkyl glycidyl ether modified hydroxyethylcellulose.

* * * * *

UNITED STATES PATENT AND TRADEMARK OFFICE
CERTIFICATE OF CORRECTION

PATENT NO. : 5,521,234
DATED : May 28, 1996
INVENTOR(S) : Richard G. Brown, Charles L. Burdick & Charles W. Vanderslice It is certified that error appears in the above-identified patent and that said Letters Patent is hereby corrected as shown below:

Column 2, line 57, insert two spaces and replace "viscosity" with --Viscosity--.

Column 3, line 35, delete "e" on Natrosol.

Signed and Sealed this

Seventh Day of January, 1997

Attest:

BRUCE LEHMAN

*Attesting Officer*   *Commissioner of Patents and Trademarks*